United States Patent
Raith et al.

(10) Patent No.: US 6,430,417 B1
(45) Date of Patent: Aug. 6, 2002

(54) MOBILE STATION ACCESS TO A BASE STATION ON A DIGITAL MULTIPLE ACCESS CONTROL CHANNEL

(75) Inventors: Krister Raith, Durham; Nils Rydbeck, Cary, both of NC (US)

(73) Assignee: Ericsson Inc., Research Triangle Park, NC (US)

(*) Notice: Subject to any disclaimer, the term of this patent is extended or adjusted under 35 U.S.C. 154(b) by 0 days.

(21) Appl. No.: 08/414,051

(22) Filed: Mar. 30, 1995

Related U.S. Application Data

(63) Continuation of application No. 07/738,917, filed on Aug. 1, 1991.

(51) Int. Cl.[7] ................................................. H04Q 7/20
(52) U.S. Cl. ........................................................ 455/466
(58) Field of Search ........................ 370/29.1, 18, 94.1, 370/95.1; 375/101; 379/58, 60; 455/33.2, 466

(56) References Cited

U.S. PATENT DOCUMENTS

| | | | | |
|---|---|---|---|---|
| 4,815,073 A | | 3/1989 | Grauel et al. ................. 379/60 |
| 4,887,050 A | * | 12/1989 | Barth et al. .................... 331/34 |
| 5,088,108 A | * | 2/1992 | Uddenfeldt et al. .......... 375/12 |
| 5,109,527 A | * | 4/1992 | Akerberg .................... 455/33.2 |
| 5,119,397 A | * | 6/1992 | Dahlin ............................ 375/5 |
| 5,127,100 A | * | 6/1992 | D'Amico et al. ........... 455/33.1 |
| 5,155,742 A | * | 10/1992 | Ariyavisitakul et al. ...... 375/13 |
| 5,184,347 A | * | 2/1993 | Farwell et al. ............. 370/94.1 |
| 5,184,349 A | * | 2/1993 | Riordan ..................... 370/95.3 |
| 5,204,976 A | * | 4/1993 | Baldwin et al. ........... 455/234.2 |
| 5,208,812 A | * | 5/1993 | Dudek et al. ............ 370/100.1 |
| 5,228,026 A | * | 7/1993 | Albrow et al. ................ 370/29 |
| 5,249,205 A | * | 9/1993 | Chennakeshu et al. ..... 375/101 |
| 5,309,503 A | * | 5/1994 | Bruckert et al. .............. 379/60 |
| 5,416,779 A | * | 5/1995 | Barnes et al. .............. 370/29.1 |

OTHER PUBLICATIONS

Telecommunications Industry Association, EIA/TIA Intermn Standard, Apr. 1992.*

"Personal Digital Cellular Telecommunication System RCR Standard", RCR STD-27B, Revision B, Dec. 10, 1992, Research & Development Center for Radio Systems (RCR).

* cited by examiner

Primary Examiner—William Cumming
(74) Attorney, Agent, or Firm—Coats & Bennett, P.L.L.C.

(57) ABSTRACT

In a cellular mobile radiotelephone system, two different digital burst access methods are defined using to the greatest extent possible previously defined burst structures. The type of access method to be used in a particular cell is indicated on that cell's control channel. In very large cells, a two-burst access method is used including a shortened pre-access burst and a regular access burst. The shortened pre-access burst avoids collision with other bursts and provides time-alignment information to the cell's base station. In response to a time-alignment order, the mobile station then transmits a regular access burst. In smaller cells, a regular single-burst access procedure is used. The access methods use existing burst structures except that the fields CDVCC and SACCH are used for different purposes that may include improved synchronization, control channel identification and reservation of time slots for multi-burst access. Beyond a simple two-burst access method, according to a multi-burst access method, accesses may include essentially an arbitrary number of bursts limited only by system time-out limits.

33 Claims, 10 Drawing Sheets

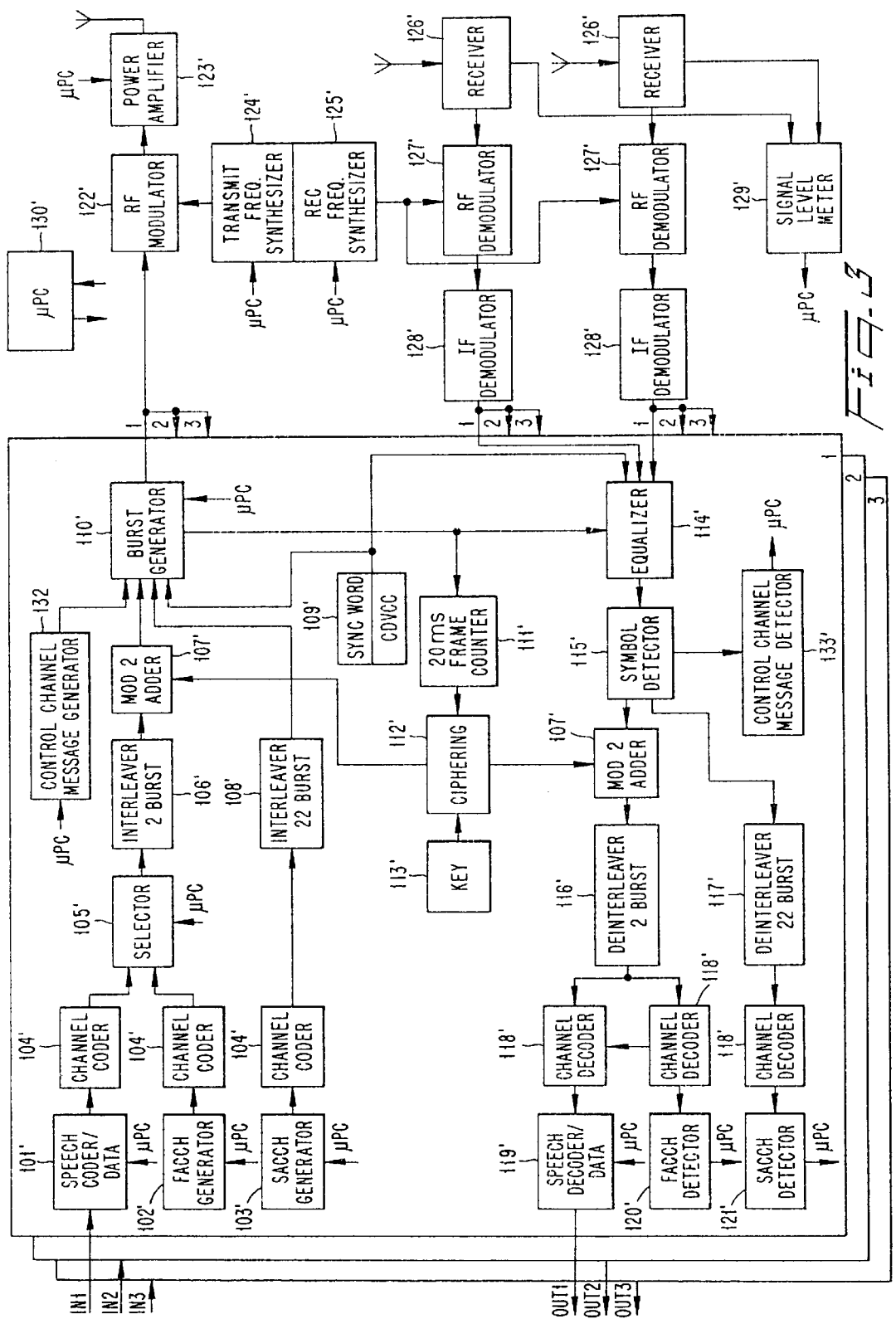

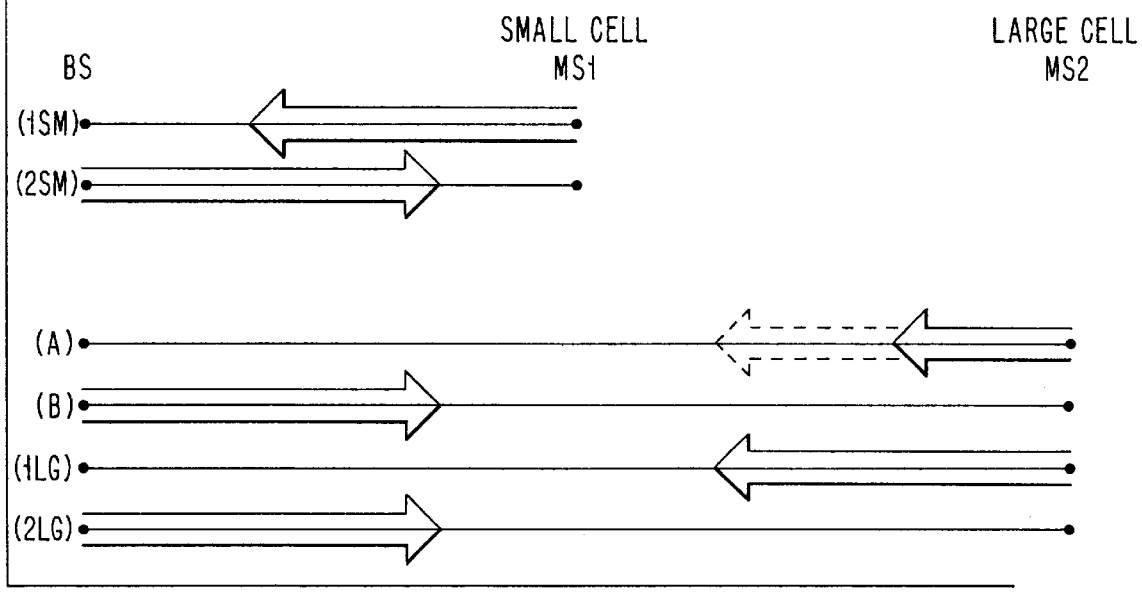
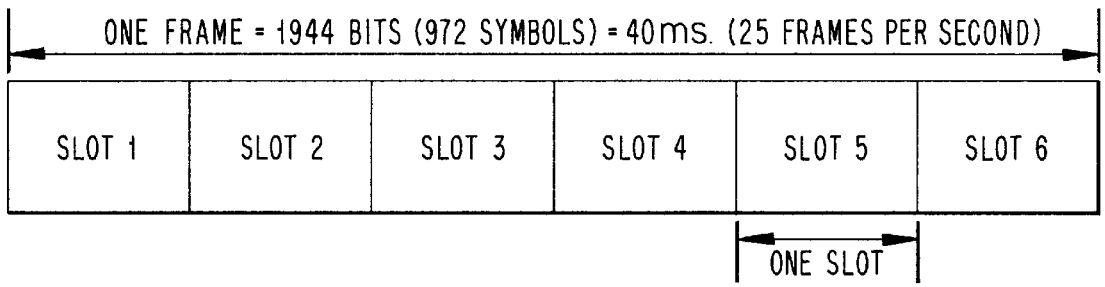

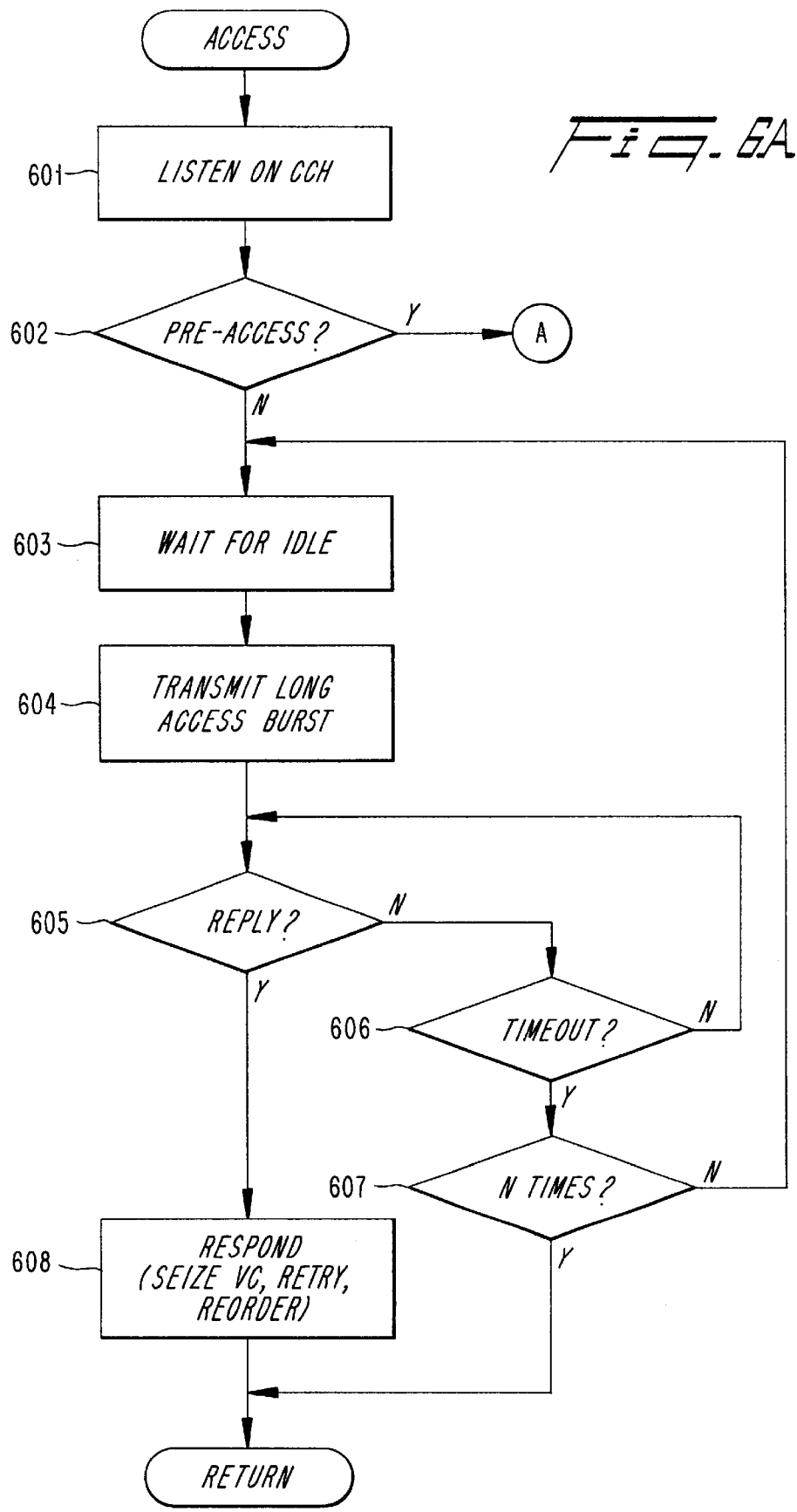

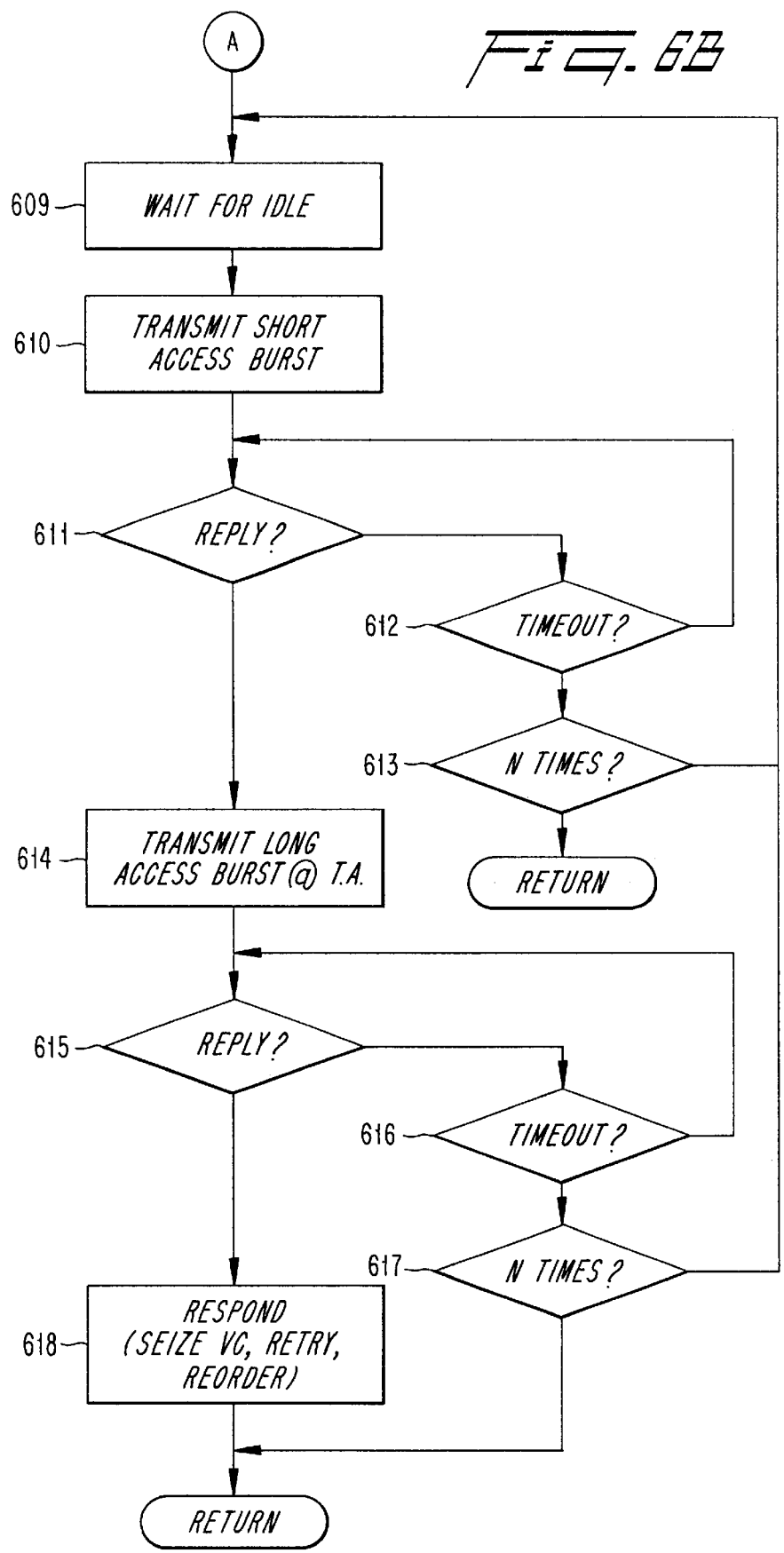

Fig. 7A

(UPLINK)

| G | R | DATA | SYNC | DATA D | RES | DATA D |
|---|---|------|------|--------|-----|--------|

Fig. 7B

(DOWNLINK)

| SYNC | RES 1 | DATA D | RES 2 | DATA D | RSVD |
|------|-------|--------|-------|--------|------|

Fig. 8

| CC SLOT 1 CONTROL CHANNEL | TC SLOT 2 TRAFFIC CHANNEL | TC SLOT 3 TRAFFIC CHANNEL | CC SLOT 4 CONTROL CHANNEL | TC SLOT 5 TRAFFIC CHANNEL | TC SLOT 6 TRAFFIC CHANNEL |
|---|---|---|---|---|---|

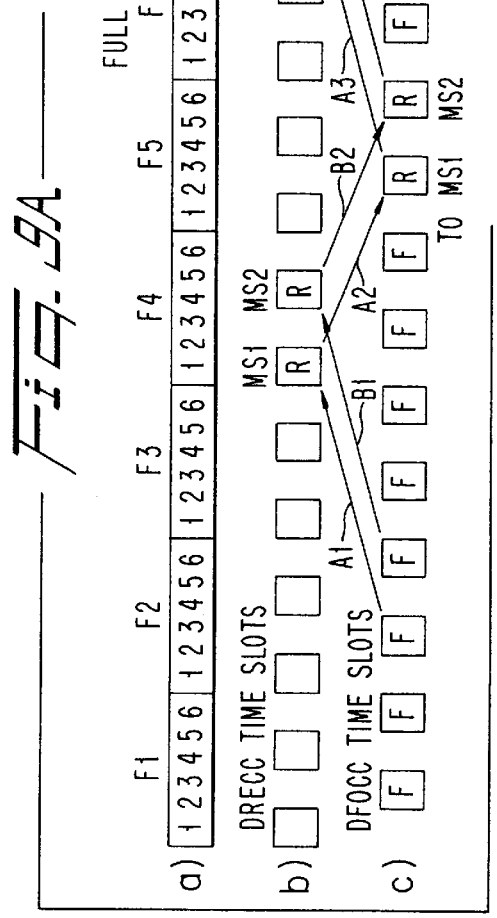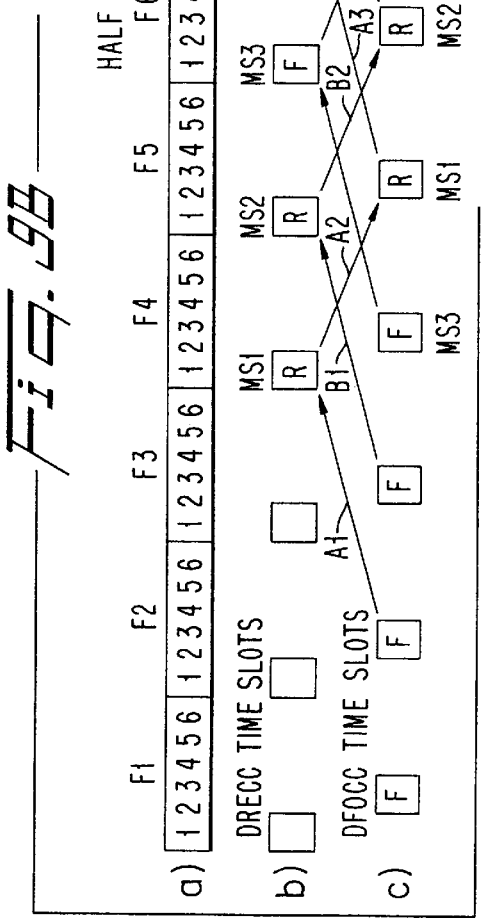

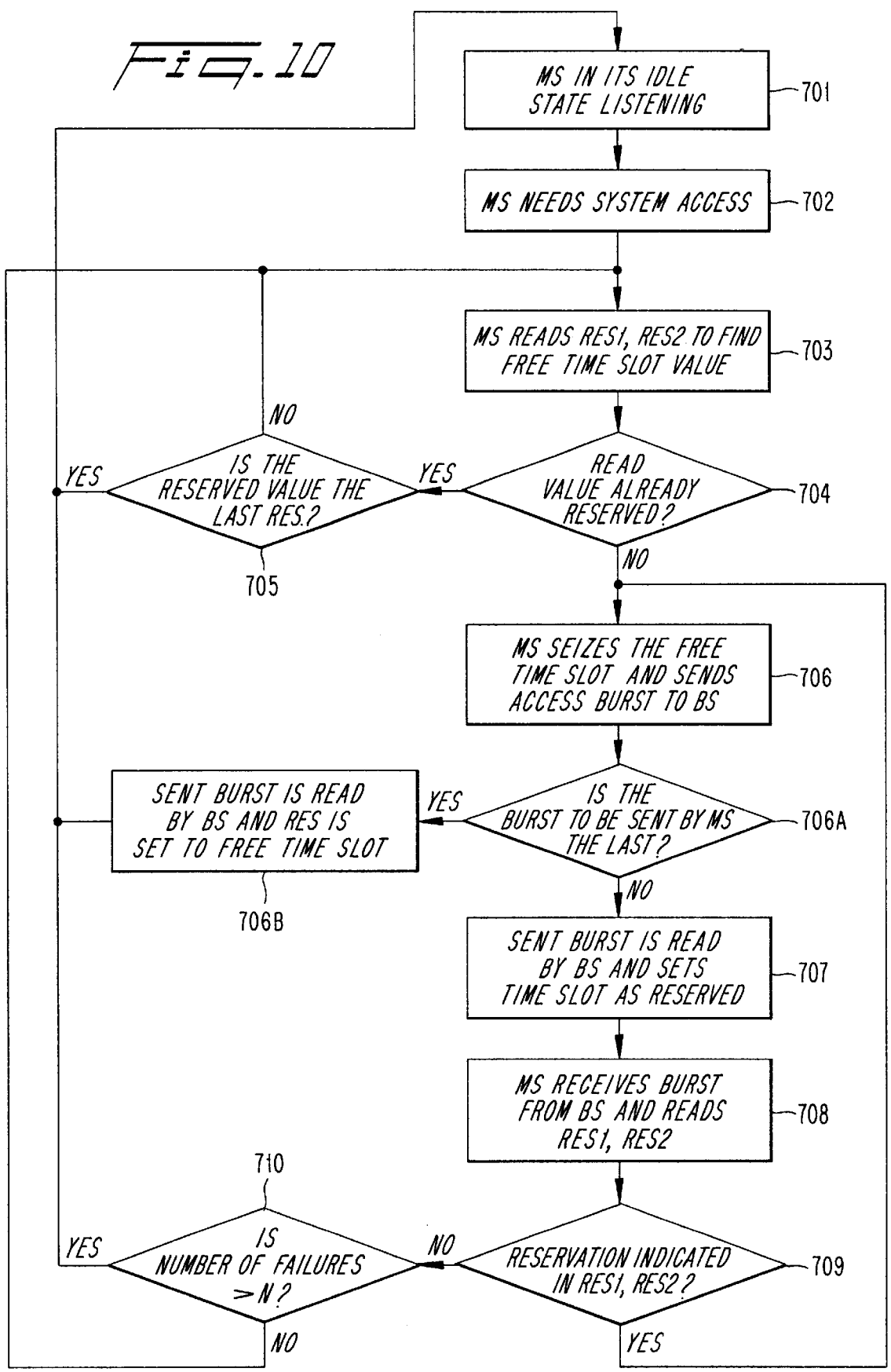

MOBILE STATION ACCESS TO A BASE STATION ON A DIGITAL MULTIPLE ACCESS CONTROL CHANNEL

This application is a continuation, of application Ser. No. 07/738,917, filed Aug. 1, 1991.

FIELD OF THE INVENTION

The present invention is directed to a mobile cellular radio telephone system having digital voice/traffic capacity wherein digital control channels may occupy the same radio channel time slots as voice/traffic channels. More specifically, the present invention relates to a method and system for performing the access function on a digital control channel.

BACKGROUND OF THE INVENTION

The first cellular mobile radio systems in public use were generally analog systems for the transmission of speech or other analog information. The systems comprised a plurality of radio channels for transmitting analog information between base and mobile stations by transmitting analog modulated radio signals. In general, the first cellular mobile radio systems had comparatively large coverage cells. More recently, digital cellular mobile radio systems for public use have been designed.

Digital cellular mobile radio systems comprise digital channels for transmitting digital or digitized analog information between base and mobile stations, by transmitting digitally modulated radio signals. Digital cellular mobile radio systems offer substantial advantages over analog cellular mobile radio systems.

One digital mobile radio system intended to be used as a common system for many European countries is the GSM system. In European countries already having an analog cellular mobile system, the new digital GSM system is intended to be introduced as a new system which is independent of any existing analog system. The GSM system base and mobile stations have not been designed to be compatible with existing systems; rather, they are designed to give optimum performance in various aspects within the system and of the system itself. Accordingly there has been a comparatively great freedom of choice in technical matters in the design of the GSM system.

Rather than introduce a new independent digital cellular mobile radio system, like the GSM system, in an area with an existing analog cellular system, it has been proposed to introduce a digital cellular mobile radio system which is designed for cooperation with the existing analog cellular mobile radio system. In order to obtain digital channels within the frequency band allotted to cellular mobile radio systems, there have been proposals to withdraw a number of radio channels allotted to the present analog mobile radio systems and use them in the digital cellular mobile radio system. Due to the proposed design of the digital mobile radio system, three or possibly six digital channels may occupy the same frequency band of one previous analog radio channel by using time division multiplexing. Accordingly, replacing some analog channels by digital channels in time division multiplex may increase the total number of channels.

The intended result is to gradually introduce the digital system and to increase the number of digital traffic channels while decreasing the number of analog traffic channels in the coexisting cellular systems. Analog mobile stations already in use will then be able to continue to use the remaining analog traffic channels. Meanwhile, new digital mobile stations will be able to use the new digital traffic channels. Dual-mode mobile stations will be able to use both the remaining analog and the new digital traffic channels.

With the addition of the new digital traffic channels, a corresponding need for new digital control channels arises. The conventional dual-mode systems for the most part utilize existing analog channels, such as dedicated frequencies, as the control channel.

However, the new fully digital systems will use digital control channels which occupy TDMA time slots of the same type as used for digital traffic channels.

Such digital control channels have earlier been used in the European GSM system. In GSM an access is always performed using a single burst in order to minimize occupancy of the channel dedicated for accesses. Any subsequent actions like authentication and ciphering are performed on another type of control channel assigned after the actual access. This use in GSM of several types of control channels implies considerable complexity. For this reason, and for better compatibility with the existing North-American dual mode system, it is preferred to use only one type of uplink control channel for the fully digital system in the USA. A consequence of this decision is that the control channel used for access in the USA must be able to handle other functions besides access such as authentication or ciphering, which require more than one burst in a message. The present invention solves the special problems associated with the use of multi-burst access messages. The present invention further solves the problem of access burst collisions in very large cells.

SUMMARY OF THE INVENTION

It is an object of the present invention to provide a procedure usable by a mobile station to access the land system via a digital control channel, taking into consideration that existing EIA/TIA-54 formats for digital traffic channels shall be used with minimum modification for the digital control channel in order to achieve low hardware complexity in the mobile station. This is accomplished by using the same format for both the traffic channels and the control channels except that the CDVCC and SACCH fields of the traffic channel are used on the control channel to perform the function of structuring the access to the land system from a mobile.

It is a further object of the invention to avoid access burst collision in very large cells. This is accomplished by defining two separate access methods, one to be used in very large cells and the other to be used in smaller cells. According to an access method to be used in very large cells, a mobile station transmits two access bursts, a first shortened access burst containing mainly synchronization information and enabling time-alignment information for the mobile station to be derived and a second normal-length access burst containing the usual access information.

It is a further object of the invention to provide sufficient synchronization information in an access burst to ensure good reception. This is achieved by using the CDVCC and SACCH fields defined in existing EIA/TIA-54 formats to transmit additional synchronization information.

It is a further object of the invention to provide an access method with a low probability of causing multiple accesses, i.e. an access method not making more than one base station believe that it has been granted access. This is achieved by using the digital verification color code DVCC when coding/decoding the cyclic redundancy check CRC the same way as for the traffic channels. In other words, the "implicit" DVCC is still used whereas the "explicit" DVCC (the CDVCC field in the message) is used for the access procedure.

The two fields CDVCC and SACCH have 12 bits each for a total of 24 bits that may be used on the digital access channel. Besides being used to improve synchronization, especially in the uplink direction, the 24 bits may further be used to distinguish between control channels and traffic channels and to carry reservation information for multi-burst accesses. For example, the 24 bits may carry one out of two possible patterns uplink and one out of two possible patterns downlink. Thereby two things are accomplished: firstly, in addition to improving synchronization uplink, distinction of a control channel from a traffic channel is facilitated downlink by using, in addition to the standardized 28-bit sync word, two of the possible 24-bit patterns in the CDVCC-SACCH fields as distinguishing sync words (the other (2**24)-2 patterns are illegal); secondly, transmitting downlink the messages "free" or "reserved" and uplink the messages "reserve" or "do not reserve" as one out of the two allowed 24-bit patterns virtually excludes misinterpretation.

BRIEF DESCRIPTION OF THE DRAWINGS

FIG. 3 illustrates a block diagram of a base station utilized in accordance with the present invention;

FIG. 4 is a representation of two different access methods according to the present invention;

FIG. 5A illustrates the frame structure of a radio channel as utilized in accordance with the present invention;

FIG. 5F illustrates the format of a shortened burst;

FIG. 5G illustrates the format of a shortened-access burst according to the present invention;

FIG. 6, including FIGS. 6A and 6B, is a flowchart describing the access method of the present invention;

FIG. 7A illustrates a time slot format for transmissions from a mobile station to a base or land station with a reservation field according to a modification of the present invention;

FIG. 7B illustrates a time slot format for transmissions from a base or land station to a mobile station with two reservation fields according to a modification of the present invention;

FIG. 8 illustrates an example of a radio channel frame having six time slots in which control channels and traffic channels are mixed;

FIG. 9A is a diagram illustrating the multiburst access method according to a modification of the present invention for the full rate mode;

FIG. 9B is a similar diagram for the half rate mode;

FIG. 10 is a flow chart describing a modification of the access method of the present invention.

DETAILED DESCRIPTION OF THE ILLUSTRATED EMBODIMENTS

Figure 1:
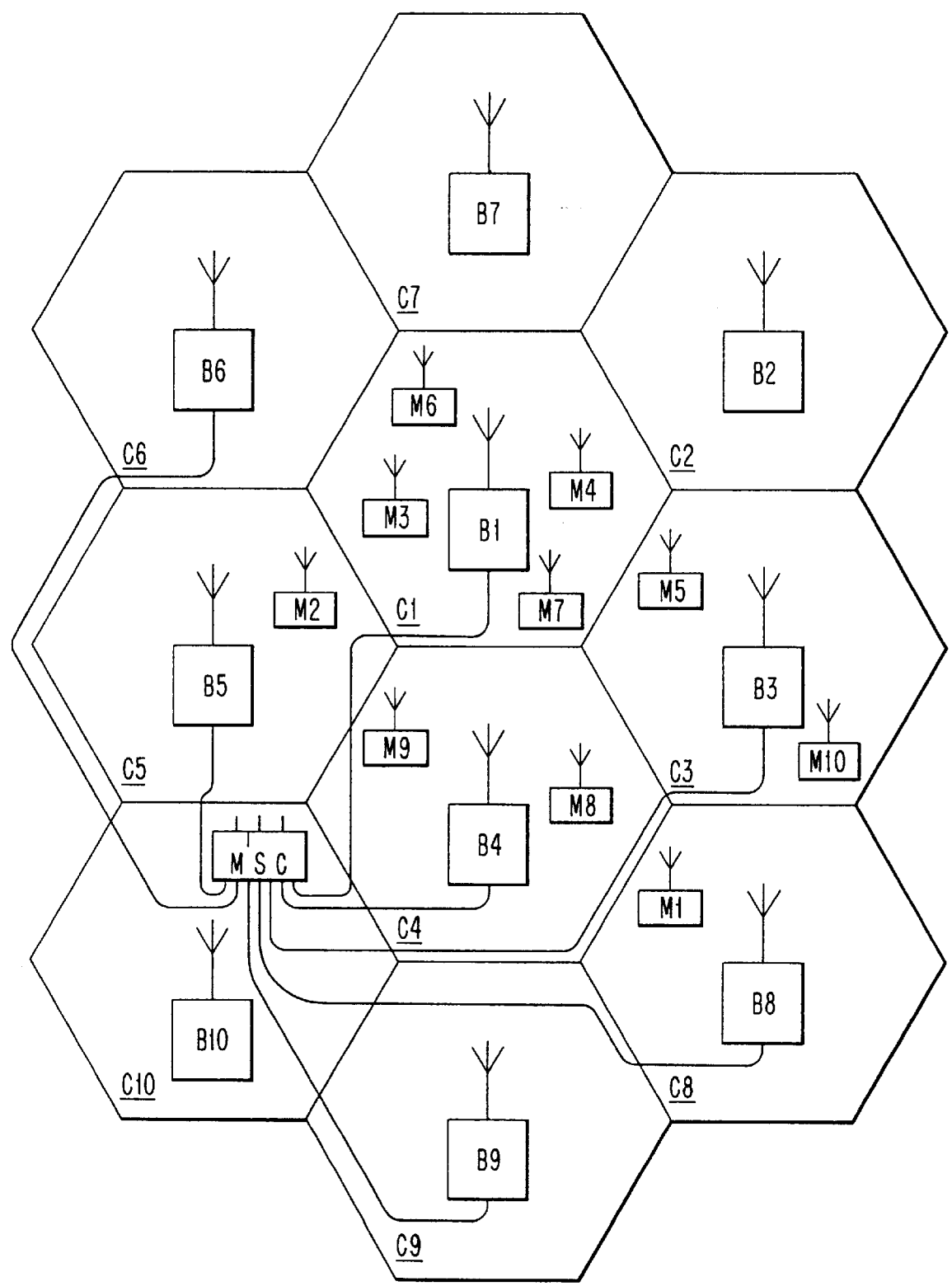
FIG. 1 illustrates a part of a cellular mobile radio system with cells, a mobile switching center, base stations and mobile stations.

FIG. 1 illustrates ten cells C1 to C10 in a cellular mobile radio system. In actual practice, the method and means according to the present invention are implemented in cellular mobile radio system comprising many more cells than ten. However, for the purpose of explaining the present invention, ten cells is deemed to be sufficient.

For each of the cells C1 through C10 there is a base station B1 through B10, respectively, with the same number as the cell. FIG. 1 illustrates base stations situated in the vicinity of the center of the cell and having omni-directional antennas. The base stations of adjacent cells may, however, be situated in the vicinity of cell borders and have directional antennas as is well known to those of ordinary skill in the art.

FIG. 1 also illustrates ten mobile stations M1 through M10 which are movable within a cell and from one cell to another cell. In actual practice, the method and means according to the present invention are implemented in a cellular mobile radio system comprising many more mobile stations than ten. In particular, there are usually many more mobile stations than there are base stations. However, for the purpose of explaining the present invention, the use of ten mobile stations is deemed to be sufficient. The system of FIG. 1 also includes a mobile switching center MSC. The mobile switching center is connected to all ten illustrated base stations by cables. The mobile switching center is also connected, by cables, to a fixed public switching telephone network or similar fixed network with ISDN facilities. Not all cables from the mobile switching center to the base stations and cables to the fixed network are illustrated.

In addition to the illustrated mobile switching center, there may also be another mobile switching center connected by cables to other base stations than those illustrated in FIG. 1. Instead of cables, other means may be utilized for communication from base station to mobile switching center, e.g. fixed radio links.

The cellular mobile radio system illustrated in FIG. 1 comprises a plurality of radio channels for communication. The system is designed both for analog information, e.g. speech, digitized analog information, digitized speech, and pure digital information. According to the system, the term connection is used for a communication channel with a mobile station in the same system or another system, or a fixed telephone or terminal in a fixed network connected to the cellular mobile radio system. Thus, a connection may be defined as a call where two persons are able to talk to each other, but also may refer to a data communication channel where computers are exchanging data.

Figure 2:
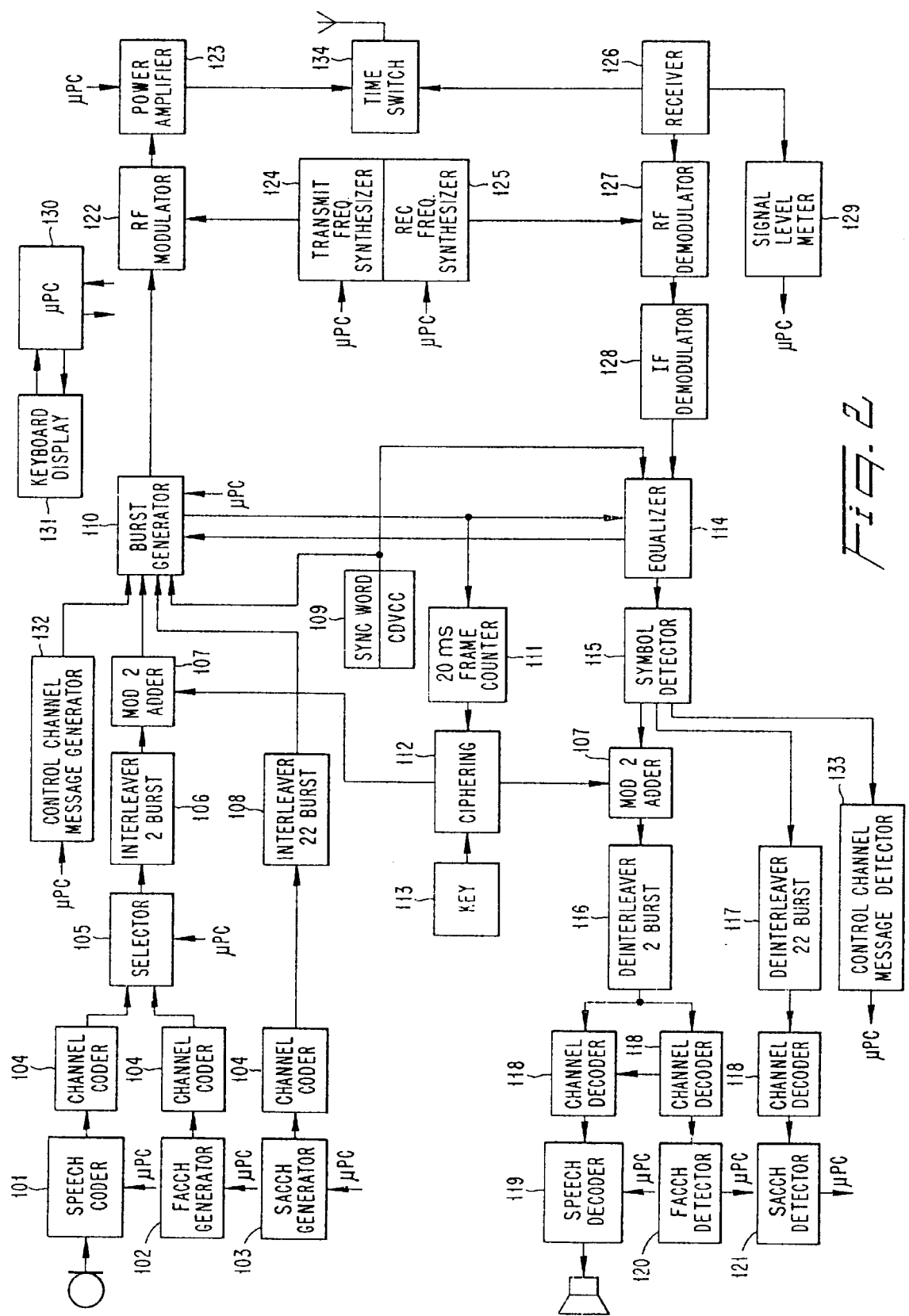
FIG. 2 illustrates a block diagram of a mobile station utilized in accordance with the present invention.

Referring now to FIG. 2, an embodiment of a mobile station that can be utilized in a cellular telephone system that operates in accordance with the present invention is illustrated. A speech coder 101 converts the analog signal generated by a microphone into a bit data stream. The bit data stream is then divided into data packages, according to the TDMA principle. A fast associated control channel (FACCH) generator 102 generates control and supervision signalling messages between the system and the mobile station and messages between the mobile station and the system. The FACCH message replaces a user frame (speech/data) whenever it is to be transmitted. A slow associated control channel (SACCH) generator 103 provides a continuous channel for the exchange of signalling messages between the base station and the mobile station and vice-versa. A fixed number of bits, e.g. twelve, is allocated to the SACCH for each time slot of the message train. Channel coders 104 are respectively connected to the speech coder 101, FACCH generator 102, and SACCH generator 103 for manipulating the incoming data in order to carry out error detection and correction. The techniques used by the channel coders 104 are convolutional encoding, which protects important data bits in the speech code, and cyclic redundancy check (CRC), wherein the perceptually significant bits in the speech coder frame, e.g. twelve bits, are used for computing a seven bit check.

A selector 105 is connected to the channel coders 104 associated with the speech coder 101 and the FACCH generator 102, respectively. The selector 105 is controlled by the microprocessor controller 130 so that at appropriate times user information over a particular speech channel is replaced with system supervision messages over FACCH. A two-burst interleaver 106 is coupled to the output of the selector 105. Data to be transmitted by the mobile station is interleaved over two distinct time slots. The 260 data bits, which constitute one transmitting word, are divided into two equal parts and are allotted two consecutive time slots. The effects of RAYLEIGH fading will be reduced in this manner. The output of the two-burst interleaver 106 is provided to the input of a modulo-two adder 107 so that the transmitted data is ciphered bit by bit by logical modulo-two addition of a pseudo-random bit stream.

The output of the channel coder 104 associated with the SACCH generator 103 is connected to a 22-burst interleaver 108. The 22-burst interleaver 108 interleaves data transmitted over SACCH over 22 time slots each consisting of 12 bits of information. The 22-burst interleaver 108 utilizes the diagonal principle so that as two SACCH messages are transmitted in parallel, the second message is displaced eleven bursts from the other message.

The mobile station further includes a Sync Word— CDVCC generator 109 for providing the appropriate synchronization word (Sync Word) and CDVCC which are to be associated with a particular connection. The Sync Word is a 28 bit word used for time slot synchronization and identification. The CDVCC (coded digital verification color code) is a 12-bit code which is sent by the base station to the mobile station and vice-versa, for assuring that the proper channel is being decoded. Prior to coding as CDVCC, DVCC itself is an 8-bit code.

A burst generator 110 generates message bursts for transmission by the mobile station. The burst generator 110 is connected to the outputs of the modulo-two adder 107, the 22-burst interleaver 108, the Sync Word/CDVCC generator 109, an equalizer 114, and a control channel message generator 132 generating channel coded control messages. A message burst comprising data (260 bits), SACCH (12 bits), Sync Word (28 bits), CDVCC (12 bits), and 12 delimiter bits, combined for a total of 324 bits are integrated according to the time slot format specified by the standard EIA/TIA IS-54.

Under the control of the microprocessor 130, two different types of message bursts are generated by the burst generator 110: control channel message bursts from the control channel message generator 132 and voice/traffic message bursts. The control channel message is generated in accordance with commands from the microprocessor 130 and is sent on a digital control channel having the same burst formats as traffic channels but where the SACCH as well as the speech data normally generated in a voice/traffic burst are replaced by control information.

The transmitting of a burst, which is equivalent to one time slot, is synchronized with the transmitting of the other two time slots, and is adjusted according to the timing determined by a microprocessor included in block 114 that also controls equalization. Due to time dispersion, an adaptive equalization method is provided in order to improve signal quality. For further information regarding adaptive equalization techniques, reference should be made to U.S. Pat. No. 5,088,108 issued Feb. 11, 1992, and assigned to the same assignee. A correlator adjusts to the timing of the received bit stream. The base station is the master and the mobile station is the slave with respect to frame timing. The microprocessor included in block 114 detects the incoming timing and synchronizes the burst generator 110. The microprocessor is also operable for checking the Sync Word and CDVCC for identification purposes.

A 20ms frame counter 111 is coupled to the burst generator 110 and so is the equalizer block 114. The frame counter 111 updates a ciphering code utilized by the mobile station every 20ms, once for every transmitted frame. It will be appreciated that according to this particular example, three time slots make up one frame. A ciphering unit 112 is provided for generating the ciphering code utilized by the mobile station. A pseudo-random algorithm is preferably utilized. The ciphering unit 112 is controlled by a key 113 which is unique for each subscriber. The ciphering unit 112 consists of a sequencer which updates the ciphering code.

The burst produced by burst generator 110, which is to be transmitted, is forwarded to an RF modulator 122. The RF modulator 122 is operable for modulating a carrier frequency according to the $\pi/4$ DQPSK method ($\pi/4$ shifted, Differentially Encoded Quadrature Phase Shift Keying). The use of this technique implies that the information is differentially encoded, i.e. 2 bit symbols are transmitted as four possible changes in phase; $\pm\pi/4$ and $\pm 3\pi/4$. The transmitter carrier frequency supplied to the RF modulator 122 is generated by a transmitting frequency synthesizer 124 in accordance with the selected transmitting channel. Before the modulated carrier is transmitted by an antenna, the carrier is amplified by a power amplifier 123. The RF power emission level of the carrier frequency is selected on command by a microprocessor controller 130. The amplified signal is passed through a time switch 134 before it reaches the antenna. The timing is synchronized to the transmitting sequence by the microprocessor controller 130.

A receiver carrier frequency is generated in accordance with the selected receiving channel by receiving frequency synthesizer 125. Incoming radio frequency signals are received by receiver 126, the strength of which are measured by signal level meter 129. The received signal strength value is then sent to the microprocessor controller 130. An RF demodulator 127 which receives the receiver carrier frequency from the receiving frequency signal from receiver 126, demodulates the radio frequency carrier signal, thus generating an intermediate frequency. The intermediate frequency signal is then demodulated by an IF demodulator 128, which restores the original $\pi/4$-DQPSK—modulated digital information.

The restored digital information provided by IF demodulator 128 is supplied to the equalizer 114. A symbol detector 115 converts the received two bit symbol format of the digital data from the equalizer 114 to a single bit data stream. The symbol detector 115 in turn produces three distinct outputs. Control channel messages are sent to a control message detector 133 which supplies channel decoded and detected control channel information to the microprocessor controller 130. Any speech data/FACCH data is supplied to a modulo-two adder 107 and a two-burst deinterleaver 116. The speech data/FACCH data is reconstructed by these components by assembling and rearranging information from two consecutive frames of the received data. The symbol detector 115 supplies SACCH data to a 22-burst deinterleaver 117. The 22-burst deinterleaver 117 reassembles and rearranges the SACCH data, which is spread over 22 consecutive frames.

The two-burst deinterleaver 116 provides the speech data/FACCH data to two channel decoders 118. The convolutionally encoded data is decoded using the reverse of the above-mentioned coding principle. The received cyclic redundancy check (CRC) bits are checked to determine if any error has occurred. The FACCH channel coder furthermore detects the distinction between the speech channel and any FACCH information, and directs the decoding accordingly. A speech decoder 119 processes the received speech data from the channel decoder 118 in accordance with a speech decoder algorithm (VSELP), and generates the received speech signal. The analog signal is finally enhanced by a filtering technique. Messages on the fast associated control channel are detected by FACCH detector 120, and the information is transferred to the microprocessor controller 130.

The output of the 22-burst deinterleaver 117 is provided to a separate channel decoder 118. Messages on the slow associated control channel are detected by SACCH detector 121, and that information is transferred to the microprocessor controller 130.

The microprocessor controller 130 controls the mobile station activity and the base station communication, and also handles the terminal keyboard input and display output 131. Decisions by the microprocessor controller 130 are made in accordance with received messages and measurements made. The keyboard and display unit 131 enable an information exchange between the user and the base station.

FIG. 3 illustrates an embodiment of a base station that can be utilized in a cellular telephone system that operates in accordance with the present invention. The base station incorporates numerous component parts which are substantially identical in construction and function to component parts of the mobile station illustrated in FIG. 2 and described in conjunction therewith. Such identical component parts are designated in FIG. 3 with the same reference numerals utilized hereinabove in the description of the mobile station, but are differentiated therefrom by means of a prime (') designation.

There are, however, minor distinction between the mobile and base stations. For instance, the base station has two receiving antennas. Associated with each of these receiving antennas are a receiver 126', an RF demodulator 127', and an IF demodulator 128'. Furthermore, the base station does not include a user keyboard and display unit 131 as utilized in the mobile station. Another difference is that a base station handles the communication of many mobiles, which can be seen from the provision of three channel handlers 1, 2, 3, each of which handles one out of 3 time slots of one frequency.

When power is applied to the mobile station, the microprocessor controller 130 executes an initialization procedure. Initially, the serving system parameters are retrieved, meaning that the preferred system, e.g., wire-line (B) or non-wire-line (A) is selected. Depending on the choice made, the scanning of the dedicated control channels belonging to the preferred system starts.

The receiving frequency synthesizer 125 is ordered by the microprocessor controller 130 to generate the frequency which corresponds to the first dedicated control channel. When the frequency is stable, the signal level meter 129 measures the signal strength, and thereafter the microprocessor controller 130 stores the signal strength value. The same procedure is performed for the frequencies corresponding to the remaining dedicated control channels, and a ranking based on the signal strength of each is made by the microprocessor controller 130. The receiving frequency synthesizer 125 is then ordered to tune to the frequency with the highest signal strength level so that the mobile station will be able to make attempts to synchronize to that channel.

The radio signal is captured by the receiver 126 and is demodulated according to the selected carrier frequency by RF modulator 127, and then demodulated by IF demodulator 128. Synchronization and primary analysis of the digital information in the radio signal is made in the equalizer 114. If the equalizer 114 manages to detect a Sync Word, the equalizer 114 will lock to the time slot associated with that Sync Word. The mobile station waits for the system parameter overhead message decoded by the control channel message detector 133 and transferred to the microprocessor controller 130. This message contains information about the identification of the system, the protocol capability, the number of available paging channels (PC), and their specific frequency allocation.

In the situation where the equalizer 114 is not able to recognize the Sync Word within a specified period of time, the receiving frequency synthesizer is ordered by the microprocessor controller 130 to tune to the channel with the next strongest signal. If the mobile station is unable to synchronize at this second choice, the microprocessor controller 130 orders a change of the preferred systems e.g. from A to B or vice versa. Thereafter, the scanning of the dedicated control channels of the new preferred system will begin.

When the mobile station has received the system parameter overhead message, the paging channels are scanned in the same manner as the dedicated control channels, i.e., by measuring the signal strength and selecting the frequency with the strongest signal. Synchronization to the paging channels is then performed accordingly.

Upon successful synchronization on a paging channel, the mobile station will leave the initialization procedure and start an idle mode. The idle mode is characterized by four states, which are controlled by the microprocessor controller 130, and which are sequentially looped through as long as no access to the system is initiated. It should be noted that the scanning of the paging channels is performed whenever the bit error rate on the current paging channel increases above a certain level in order to assure that the mobile station is listening to the paging channel with the strongest signal strength.

The first state associated with the idle mode is a continuous updating of the mobile station status, e.g. the number of and the location of existing access channels (AC). This information is carried to the mobile station in the system parameter overhead message on the paging channel, referred to as a digital forward control channel (DFOCC). This message is decoded in the control channel message detector 133 and sent to the microprocessor controller 130. Certain messages transmitted from the base station in the system parameter overhead message demand responding actions from the mobile station, e.g. a rescan message will order the microprocessor controller 130 to restart the initialization procedure. As another example, a registration identify message from the base station will force the mobile station to make a system access in order to register in accordance with the system access mode described hereinbelow.

The second state associated with the idle mode relates to the situation where the mobile station attempts to match page messages transmitted by the base station. These mobile station control messages, which are sent over the DFOCC, are decoded in the control channel message detector 133 and analyzed by the microprocessor controller 130. If the decoded number matches the identification number of the mobile station, a connection to the base station will be prepared in the system access mode.

The third state of the idle mode involves listening to orders sent by the base station over the DFOCC. Decoded orders, such as an abbreviated alert, will be processed by the mobile station accordingly.

The fourth state in the idle mode involves the microprocessor controller 130 supervising the input from keyboard 131 for user activity, e.g. call initiating. A call origination results in the mobile station leaving the idle mode and starting the system access mode.

One of the primary tasks in the system access mode of the mobile station is the mobile station generating an access message. The digital access channels (DAC) available to the mobile, which were updated during the idle mode, are now examined in a manner similar to the measuring of the dedicated control channels as previously described. A ranking of the signal strength of each is made, and the channel associated with the strongest signal is chosen. The transmitting frequency synthesizer 124 and the receiving frequency synthesizer 125 are tuned accordingly, and a service request message is sent over the selected channel in order to inform the base station about the type of access e.g. call origination, page response, registration request or order confirmation. After completion of this message, the amplifier 123 of the mobile station is turned off and the mobile station waits for further control messages on the DFOCC. Depending on the access type, the mobile station will then receive an adequate message from the base station.

If the access type were origination or paging, the mobile station is assigned a free traffic channel by the base station, and the mobile station goes over to the traffic channel and leaves the system access mode. The mobile station will then tune the transmitting frequency synthesizer 124 and the receiving frequency synthesizer 125 to the frequencies associated with the chosen traffic channel. Thereafter, the equalizer 114 starts synchronizing. A time alignment procedure is controlled by the base station and is based on time delay measurements which are performed at the bast station on the received signal. From this moment on, exchanging of messages between the base station and the mobile station are transferred over the fast associated control channel (FACCH) and the slow associated control (SACCH).

Messages from the microprocessor controller 130 are generated by the FACCH generator 102 or the SACCH generator 103, and data is error protection coded in the channel coder 104. The FACCH data is time multiplexed with speech data in the multiplexer 105, and interleaved over two bursts by two burst interleaver 106. The data is then encrypted in the modulo-two adder 107, which is controlled by the ciphering algorithm generated by ciphering unit 112. The SACCH data is then supplied to the burst generator 110 where the SACCH data is mixed with speech data, FACCH data, the Sync Word, the CDVCC from CDVCC generator 109. The RF modulator 122 modulates the bit pattern according to the $\pi/4$-DQPSK principle. The power amplifier 123 is activated and the power level is controlled by the microprocessor controller 130 during the time of the transmitted slot.

Control messages from the base station to the microprocessor controller 130 of the mobile station are also transferred via the FACCH and SACCH. The symbol pattern is converted to a bit data stream which is directed to the speech decoder 119, FACCH detector 120, or SACCH detector 121, depending on the type of data used. Speech data and FACCH data are decrypted by the modulo-two adder 107, and the two burst deinterleaver 116. The channel decoders 117 detect bit errors and informs the microprocessor controller 130 accordingly. The SACCH is deinterleaved over 22 bursts by 22-burst deinterleaver 117 before error detection is carried out in channel decoder 118.

Messages transmitted from the base station to the mobile station typically include altering orders, requests to perform channel quality measurements, release call, and hand-off orders. Messages transmitted in the opposite direction are those initiated by the mobile station user, e.g. the release order. The last order implies that the user is finished with the call, and the mobile station will leave the control of the traffic channel and return to the initialization mode of operation.

Since the mobile stations and the respective base stations communicate across TDMA channels, multiple mobile stations sharing the same transmission and reception frequencies but being assigned separate time slots within those frequencies, each mobile station must accurately confine its transmissions to the bounds of the time slot assigned. Otherwise, transmissions from different mobile stations "collide", resulting in mutual interference and improper reception at the base station.

Accurate time-alignment becomes especially important with increasing cell size, since the maximum time difference at the base station of transmissions from the mobile stations likewise increases. Different transmitting mobile stations located at different distances from the base station experience different propagation delays. As the mobile stations move, the effect at the base state of different varying propagation delays is compensated for at the mobile stations by the base station commanding the mobile stations to adjust their transmission timing. Time slots therefore occur at the base station in regular order without any apparent affect from the different propagation delays.

While communications are being established between a mobile station and a base station, the mobile station times its transmissions in relation to transmissions received from the base station according to a "standard offset reference". According to the IS-54 standard, for example, the mobile station times its transmission such that transmission power is dying out at the conclusion of the transmission 42 symbol periods before the next expected communication burst from the base station. Until the base station has assigned the mobile station a specific transmission time, the mobile station transmits a shortened burst of shorter duration than normal to minimize the likelihood of colliding with other transmissions.

According to the present invention, control channels in the cellular mobile radio telephone system are TDMA-structured such that possible collision of access bursts from different mobile stations becomes a concern, particularly in very large cells. Such collisions may be avoided using two alternative access methods according to the present invention as illustrated in FIG. 4.

One of the access methods makes use of a relatively short access burst and the other of the access methods makes use of a relatively long access burst only. Using a short access burst, collisions may be effectively avoided, but using a long access burst more information may be transmitted. If either a short access burst or a long access burst were to be used exclusively, the advantage of the one of the short access burst and the long access burst not used could not be realized. Using two alternative access methods according to the present invention, the advantages of both types of access burst may be realized under the appropriate circumstances as will be presently described.

In a first case illustrated in the upper portion of FIG. 4, a mobile station MS1 in a comparatively small cell accesses a base station BS of that cell. Because of the small size of the cell, collision of access bursts from different mobile stations within the cell is not a concern. The mobile station MS1 therefore accesses the base station BS using a full-length burst (1SM), and the base station BS replies with a full-length burst (2SM). In the bottom portion of the figure, a mobile station MS2 in a comparatively large cell accesses the base station BS in that cell. Collision of access bursts from different mobile stations within the large cell is a concern. The mobile station MS2 therefore transmits initially a shortened pre-access burst (A) containing primarily synchronization information. The base station BS responds with a full-length burst (B) instructing the mobile station MS2 as to proper time alignment. The mobile station MS2 and the base station BS thereafter engage in an identical access exchange as the one carried out in the small cell. That is, the mobile station MS2 transmits a full-length access burst (1LG) at the time alignment specified by the base station BS. The base station BS responds with a full-length burst (2LG). The bursts (1SM) and (1LG) are identical as are the bursts (2SM) and (2LG). Since the mobile station and the base station have exchanged the exact same information after message (2LG) as after message (2SM), after this point, further communication is not dependent on what burst access type was used. The access type to be used in a particular cell is specified in an overhead message sent at intervals on the cell's control channels.

According to a preferred embodiment of the present invention, the two access types illustrated in FIG. 4 take full advantage of previously defined burst formats as will presently be explained in relation to FIG. 5.

Figure 5B:
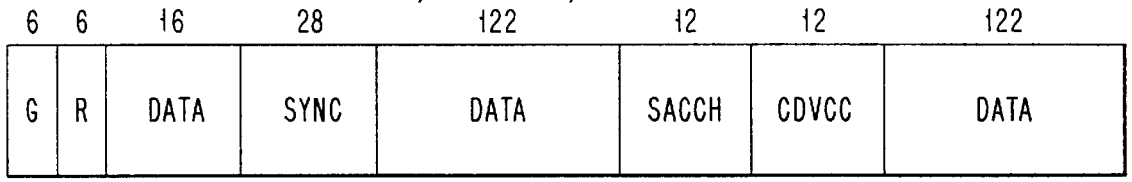
FIG. 5B illustrates a time slot format for transmissions from a mobile station to a base or land station.
Figure 5C:
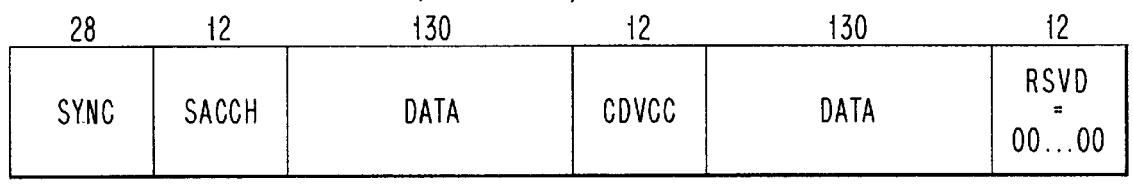
FIG. 5C illustrates a time slot format for transmissions from a base or land station to a mobile station.

FIGS. 5A, 5B and 5C illustrate the structure of the digital channels according to the EIA/TIA standard IS-54. FIG. 5A depicts the frame structure of a radio channel. According to this example, one radio channel frame consists of typically six time slots which include a total of 1,944 bits or 972 symbols. The frame is 40 milliseconds in length with a data transmission rate of 25 frames per second. Each of the time slots are typically numbered from 1–6, each respectively including a Sync Word of 28 bits as defined above.

FIGS. 5B and 5C illustrate a time slot format for transmissions from the mobile station to the land station and from the land station to the mobile station, respectively. The time slot formats commonly include 260 bits reserved for data transmissions, 12 bits for a coded digital verification color code (CDVCC), 12 bits for a slow associated control channel (SACCH), and 28 bits for synchronization and training data (SYNC). The slot format from the mobile station to the land station include two time intervals equal in duration to 6 bit blocks to provide for a guard time (G) and a ramp time (R) during which no information is transmitted. The slot format from the land station to the mobile station includes a 12 bit block which is reserved for future uses.

In a half rate alternative, each half rate voice/traffic channel utilizes one time slot of each frame. This implies that one frame comprises six half rate traffic channels with the slots being numbered sequentially 1, 2, 3, 4, 5, 6. According to the full rate alternative, each full rate traffic channel utilizes two equally spaced time slots of the frame, e.g., 1 and 4, 2 and 5, or 3 and 6. In this alterative, the time slots are numbered 1, 2, 3, and the configuration of one frame will therefore be 1, 2, 3, 1, 2, 3. For purposes of explanation it will be assumed that the present invention utilizes the full rate alternative for the following examples.

FIG. 5F shows a shortened burst format transmitted by a mobile station on a voice channel prior to receipt of a time alignment command from the base station according to the IS-54 standard. The shortened burst contains a three-symbol-length guard time G1, a three-symbol-length ramp time R, six occurrences of a 14 symbol-length Sync Word S for which the mobile station uses its assigned Sync Word, five occurrences of a six symbol-length coded digital verification color code D for which the mobile station uses its assigned DVCC in coded form and a 22 symbol-length guard time G2. In addition, the fields V, W, X and Y contains bits as follows: V=0000, W=00000000, X=000000000000 and Y=0000000000000000.

Figure 5D:
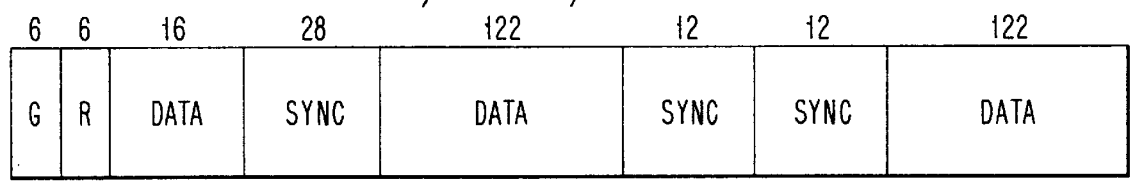
FIG. 5D illustrates the structure of a long-access burst according to the present invention.
Figure 5E:
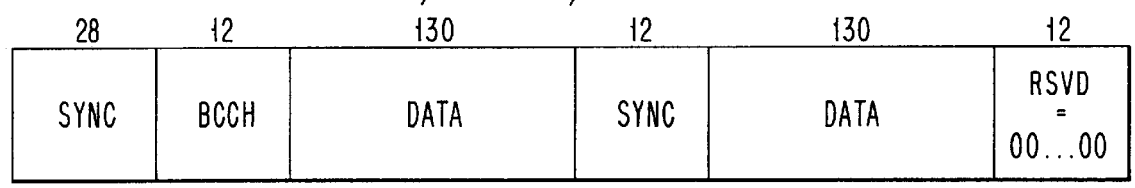
FIG. 5E illustrates the structure of a forward digital control channel according to the present invention.

In order to carry out the present method of accessing the land system via the digital control channel as illustrated in FIG. 4, the format of the radio channels according to FIGS. 5B, 5C and 5F is changed as illustrated in FIGS. 5D, 5E and 5G.

FIG. 5D shows the slot format of the radio channel from a mobile station to a land station when the channel is a digital control channel. In this case there is no need for the slow associated control channel SACCH and the coded digital verification color code CDVCC as there is if the radio channel is a traffic channel. Instead a synchronization field Sync of 12+12=24 bits is created for the purpose of transmitting synchronization information to the land station. Using the newly created Sync field, the equalizer of the base station may be retrained mid-burst in order to keep the bit error rate low. The total number of bits in a normal burst, 324, are therefore divided into the following fields as shown in Table 1 below:

TABLE 1

| | |
|---|---|
| Guard | 6 bits |
| Ramp up | 6 bits |
| Data | 16 bits |
| Syncword | 28 bits |
| Data | 122 bits |
| Synchword (SACCH) | 12 bits |
| Synchword (CVDCC) | 12 bits |
| Data | 122 bits |

The bit allocation is exactly the same as for FACCH bursts sent by the mobile station, but the SACCH and CDVCC fields are used for different purposes. A coding rate of ¼ according to rate ¼ convolutional coding results in a payload of 65 bits to be used for information. The "implicit" DVCC is included in CRC calculations for a message in the same manner as in the FACCH message.

FIG. 5E shows the slot format of the radio channel from a land station to a mobile station when the radio channel is a digital control channel. As described above, there is no need for the SACCH and the CDVCC, which may now be used for different purposes i.e., transmitting other information. Preferably, what was previously the CDVCC field is used for synchronization purposes so that the equalizer of the mobile station may be retrained mid-burst, in like manner as the equalizer of the base station described in relation to the previous figure, in order to keep the bit error rate low. In some instances, it may be desirable to augment the normal 28-bit Sync Word occurring at the beginning of the slot, and what was previously the SACCH field may be used for this purpose. In this case, both of the old 12-bit fields are used to provide synchronization information for a total of 24 bits of additional synchronization information.

In many instances, however, not all of the 24 bits will be required to achieve good synchronization. Part of the 24 bits may therefore be used to carry overhead information or reservation information (according to a modification of the present invention to be later described). In one illustrated embodiment of the invention, therefore, the 12 bit SACCH is used as a 12 bit field for realizing a broadcast control channel BCCH across which overhead information is transmitted, and the CDVCC is used as a 12 bit field Sync for the purpose of transmitting synchronization information to the mobile station in order to retrain the equalizer of the mobile station as described above. The 324 bits in a normal burst are therefore divided into the following fields as shown in Table 2 below. As before,, the bit allocation is exactly the same as for a FACCH burst sent from the base station, but the SACCH and CDVCC fields are used for other purposes. A coding rate of ¼ gives a payload of 65 bits. It should be observed that the bit allocation set forth in Table 2, particularly with respect to the 24 bits previously used for SACCH and CDVCC, is illustrative only and that these 24 bits may be used for any of the purposes mentioned above or for other purposes.

TABLE 2

| | |
|---|---|
| Syncword | 28 bits |
| BCCH (SACCH) | 12 bits |
| Data | 130 bits |
| Syncword (CDVCC) | 12 bits |
| Data | 130 bits |
| Reserved | 12 bits |

FIG. 5G shows the slot format of the radio channel from a mobile station to a land station when the radio channel is a digital control channel and the land station indicates on its control channel that a two-burst type of access is to be used, as for instance in a very large cell. The burst is identical to the normal shortened burst of FIG. 5F except that where the CDVCC field D previously appeared, a field I now appears, six symbols in length and containing abbreviated mobile identification number (MIN) information churned (i.e., arithmetically combined) with the assigned DVCC.

The MIN information may be full, uniquely identifying the mobile station, or partial, not identifying the mobile station uniquely. In a preferred embodiment only a partial MIN is transmitted in order to preserve insofar as possible the original bit placement of the shortened burst. In some circumstances, however, it may be desirable to alter bit placement in the shortened burst in order to accommodate a full MIN.

The two alternative access methods according to the present invention may be summarized as shown in Table 3 below:

TABLE 3

| Downlink; | Burstformat | FACCH |
|---|---|---|
| | Interleaving | sim. FACCH |
| | SACCH field content | BCCH |
| | CDVCC field content | sync |

TABLE 3-continued

| Uplink; | Burstformat | FACCH/SB |
|---|---|---|
| | Interleaving | sim. FACCH |
| | SACCH field content | sync |
| | CDVCC field content | sync |

In the downlink direction, burst format and interleaving are similar as with the previously defined fast associated control channel (FACCH). What was previously the SACCH field, however, contains BCCH information and what was previously the CDVCC field contains synchronization information. In the uplink direction, i.e., from the mobile station to the base station, the burst format is either similar to that of FACCH in the normal case or to that of the shortened burst in large cells. What were previously the SACCH and CDVCC fields are combined into a single field containing synchronization information.

Some departure from the established FACCH format is necessary with respect to interleaving, since FACCH uses two-burst interleaving, an impossibility if only a single access burst is to be sent. More particularly, according to the present FACCH format, if the bursts A, B, and C are to be transmitted, a first half of the burst contents of each of the bursts being designated by the numeral 1 and a second half of the burst contents being designated by the numeral two, interleaving causes a burst to be transmitted that straddles the natural boundary of two of the original bursts. After interleaving, therefore, what is transmitted is a burst $A_2B_1$ followed by a burst $B_2C_1$, etc. Two interleaved bursts are required to transmit one non-interleaved burst. To adhere to such an arrangement when it is desired to transmit only a single burst of information would dictate that each of the two resulting interleaved bursts be half empty, a great inefficiency. Instead, the same word may be fed twice to the burst formatter, using only alternate ones of the words that come out of the burst formatter. Feeding the sequence, $A_1A_2A_1A_2B_1B_2B_1B_2C_1C_2C_1C_2$ to the burst formatter would result in the output $A_2A_1(A_2B_1)B_2B_1(B_2C_1)C_2C_1\ldots$, etc. Using only every other output word, single-burst interleaving may be achieved with minimal hardware and software modifications. Alternatively, a new optimal interleaving arrangement may be designed and implemented for single burst transmissions. In either case, according to the present invention, the in-burst placement (non-interleaved) of bits is kept the same as in FACCH to the greatest extent possible.

The access method of the present invention using two different types of accesses depending on whether the cell is large or small will now be described in connection with FIG. 6. Referring first to FIG. 6A, the mobile station in step 601 first listens on the control channel to which it is tuned to determine whether the present cell uses a regular type of access or a two-burst access including a shortened pre-access burst, as shown in step 602. In the case of a normal-type access, the mobile station in step 603 waits until an idle indication in the data stream of the forward control channel (FOCC) occurs, indicating that the base station is available to handle an access request. The mobile station then transmits a long access burst of similar format as a normal-length burst transmitted on a voice channel in the uplink direction according to IS-54, but modified as described above. In step 605 and 606, the mobile station awaits a reply from the base station. If no reply is forthcoming, the mobile station may retransmit a long access burst up to N times without reply as determined in Step 607 before the access routine is exited. Most likely, the base station will respond, using a normal length burst similar to that transmitted on the voice channel in the downlink direction according to IS-54 but modified as described above. The base station will instruct the mobile station to perform the appropriate action such as seize a designated voice channel, retry the access request or reorder at a later time.

If in step 602 the type of access is designated as a two-burst access including a shortened pre-access burst, the access routine proceeds to step 609 in FIG. 6B in which the mobile station waits for an idle indication from the base station. The mobile station then transmits in step 610 a shortened access burst of a format similar to that of a shortened burst transmitted in the uplink direction on the voice channel according to IS-54 but modified as described above. The mobile station then awaits a reply from the base station, absent which the mobile station may retransmit the short access burst up to a maximum of N times. Assuming a reply is received, the mobile station then transmits a normal long-access burst at a time alignment indicated in a message from the base station as shown in step 614. The access routine then proceeds identically as the normal access method described in connection with FIG. 6A.

As described above, an access method using only two access types, a normal single-burst access and a two-burst access, is effected to prevent access burst collisions and to ensure adequate synchronization. The present invention may be generalized, however, to accommodate multi-burst accesses having different numbers of bursts.

In order to carry out a modification of present method of accessing the land system via the digital control channel the format of the radio channels according to FIGS. 5B and 5C is changed as it appears from FIG. 7A and FIG. 7B.

FIG. 7A shows the slot format of the radio channel from a mobile station to a land station when the channel is a digital control channel. In this case there is no need for the slow associated control channel SACCH and the digital verification color code CDVCC as there is if the radio channel is a traffic channel. Instead a reservation field RES of 12+12 =24 bits is created for the purpose of transmitting information to the land station as will be described in greater detail in connection with FIGS. 9A and 9B.

FIG. 7B shows the slot format of the radio channel from a land station to a mobile station when the radio channel is a digital control channel. As described above there is no need for the SACCH and the CDVCC and these fields may be used to transmit other information. The 12 bit SACCH is now a first 12 bit reservation field RES1 and the CDVCC is now a second 12 bit reservation field RES2 for the purpose of transmitting information to the mobile station as will be described in greater detail in connection with FIGS. 9A and 9B.

FIG. 8 illustrates a standardized frame which comprises both control channels and traffic channels. In this particular example, time slots 1 and 4 are utilized as control channels and time slots 2, 3, 5 and 6 are utilized as traffic channels in the full rate mode of the system. Of course, different arrangements are also possible, and the illustrated arrangement is intended to be exemplary only. In a half rate mode of transmission which will be described in connection with FIG. 9B, only time slot 1 in each frame is utilized as a control channel, while the slots 2–6 are utilized as traffic channels, this arrangement again being exemplary only.

The inventive multi-burst access method will now be described in detail in connection with FIG. 9 for the full rate mode of the mobile system.

The first line a) in FIG. 9A shows a number of frames F1, F2 . . . each including 6 time slots 1–6. Since the channels in this case are structured according to the full rate alternative, time slots 1 and 4 in each frame are used as control channels and can be free for exchanging control information such as access messages, authentication messages and so on. The frame structure in line a) is the frame structure for the digital forward control channel DFOCC and the digital reverse control channel DRECC, indicating the time slots in a frame for these channels on a particular carrier frequency. Line b) in FIG. 9A shows the positions of the time slots for the digital reverse control channel DRECC and line c) indicates the positions of the time slots for the forward control channel DFOCC. The time slot positions for the DRECC are the reference positions and coincide with the frame structure and time slots according to line a). The DRECC time slots are used for transmission uplink (MS→BS) and the DFOCC time slots are used for the downlink transmission (BS→MS). The time slots used for speech transmission are not indicated.

The DFOCC time slots are displaced a certain amount from the DRECC time slots as specified due to signal strength measurements, a reversal time from transmit to receive mode and so on.

Initially a mobile station will typically be in its idle mode looking for any control data (information) bursts in the DFOCC time slots marked by "F" in FIG. 9A, line c). However, the present method is not limited to this mode of operation but can also be used when the mobile station performs the tasks in the subsequent access mode as described earlier.

Thus the base station transmits a control message in the DFOCC time slots "F" and in the RES1 and/or RES2 fields, directed to one mobile station or to all mobile stations reading the DFOCC-message on a particular DFOCC frequency channel indicating that time slot #1 on this frequency (or on other frequencies $f_2, f_3, \ldots$ ) is free.

It is assumed that a certain station MS1 has received the above message that time slot #1 is free (arrow A1). This free time slot is thus reserved for mobile MS1 in the DRECC channel when the mobile MS1 wants to send to the base station. The reserved time slot is marked by R in frame F4.

When the mobile station MS1 sends in this reserved time slot (arrow A2) it also demands that the next time slot #1 should be reserved. The base station only makes a notation that this time slot #1 should be reserved and sends (arrow A3) any control message to the mobile station MS1. Thus time slot R in frame F7 is reserved for the mobile MS1. There is a possibility that another mobile station MS2 has got the free slot message F in frame F2 on the DFOCC but has a weaker signal strength when sending in time slot #1, frame F4 to the base station. The mobile station MS1 with the stronger signal will "win" and a reservation of the time slot # in frame F7 is made for the mobile MS1.

Thus the base station only makes a reservation of time slot #1 in the DFECC for the mobile MS1 and the mobile MS1 accepts the reserved time slot. Since in this example, the mobile wants to send its control message during three time slots it accepts the reserved time slots #1 in frames F4, F7. When the mobile station MS1 uses the reserved time slot #1, frame F10 after having received a control message (arrow A5) from the base station, it is using this reserved time slot for the last time, since the mobile MS1 has used three time slots for control messages including the last time slot. Mobile station MS1 therefor responds by sending a message that the used time slot #1 now is free and sends its last control message in the reservation field RES (FIG. 7A), arrow A6.

FIG. 9A also shows the case when another mobile station MS2 has accessed the system via the base station but a little later than did mobile station MS1 on the same carrier frequency $f_1$. While time slot #1 was allotted to mobile MS1, time slot #4 in the same frame is allotted to mobile MS2. This mobile station is assumed to make a two-burst access to the base station. The same procedure as for mobile station MS1 is initiated (arrows B1, B2), but when the base station sends its control message (arrow B3) to mobile station MS2, it will respond that it will not need more time slots #4 (in addition to its control information). Mobile station MS2 therefore sends a message (arrow B4) to the base station that this time slot #4 can be free.

As it appears from FIG. 9A time slot #1 every fourth frame is used by mobile station MS1 and time slot #4 is used every fourth frame by mobile station MS2. Thus time slots #1 and #4 in two intermediate frames are empty. These time slots can be accessed by further additional mobile stations. It can also be observed that the mobile station itself is ordering if it needs more time slots for access or if subsequent time slots can be left free by the base station. This implies that the probability of collision between access messages from mobiles to the base station (i.e. to the system) is minimized.

The access procedure of the present invention can also use a half rate channel as an access channel. FIG. 9B shows such a case, where only one time slot in each frame is used for the multiburst accesses.

In FIG. 9B, the mobile station MS1 finds a message in the downlink time slot of the second frame and a reservation is made in the base station for mobile station MS1 in this time slot, arrow A1. The following procedure according to arrows A2–A7 is the same as for mobile station MS1 in the full rate mode described in FIG. 9A and so also for the mobile stations MS2, MS3.

FIG. 10 is a flow chart describing the various steps taken in the mobile station and in the base station to perform the method according to a modification of the present invention.

In block 701, a mobile station of a plurality of mobile stations is in its idle state receiving data messages from the system via a base station on the Digital Forward Control Channel (DFOCC) in time slots each with a format as shown in FIG. 7B. These messages are directed to individual mobile stations or to all mobile stations capable of reading this particular DFOCC. Messages directed to all mobile stations, i.e. Broadcast messages, contain information about the system and information controlling the actions taken by mobiles during system access.

In block 702 a need for a system access occurs in a mobile station. The reason can be a response to a page or a response to a change in system information like registration control data, or the mobile station subscriber wishes to make an origination access.

In block 703 the mobile station initiates its access by reading reservation information RES1 and/or RES2 in a burst on the DFOCC from the base station (arrow A1 in FIG. 9A). The value of the field is detected, and it is investigated in MS whether this value is an indication by the base station of a reserved or free block 704. If the value of the reservation field RES1, RES2 indicates that the time slot is reserved for another mobile, the process is transferred to block 705 in the mobile station. If on the other hand the reservation field RES1, RES2 indicates that the time slot is not reserved ("free") the process is transferred to block 706.

In block 705 a time slot is found by the mobile to be reserved. The number n of occurrences of this type (without entering block 706) is subjected to a limit. If the maximum number N is exceeded ("Yes", block 705) the process is aborted and returned to block 701. If on the other hand the maximum number N is not exceeded ("No", block 705), block 703 is reentered after a random delay.

In block 706, the mobile station seizes the time slot indicated as free by the base station by starting the transmitter and sending the first burst in the access message (arrow A2, FIG. 9A).

In block 706A it is investigated by the mobile station if the access message contains more bursts to be sent to the base station and the reservation field RES in the DRECC is set to reserved and the process is transferred to block 707.

If on the other hand this was the last burst in the access message, the sent burst is read by the base station and the RES field is set to free and the process returns to block 701, while the mobile station waits for the system to respond, block 706B.

In block 707, the base station in the system reads the burst transmitted by the mobile station (arrow A2, FIG. 9A). The system checks the validity of the data word contained in the burst and detects the contents of the received reservation field RES. If the data word is found valid (checksum OK) and the reservation field indicates reservation, the system sets the corresponding reservation field RES1, RES2 of the DFOCC to "reserved".

In block 708 the mobile station receives (arrow A3) and reads the reservation fields RES1, RES2 set by the system. The received message from the base station is investigated, block 709. If the mobile station, in block 709 finds a reservation in the fields RES1, RES2 the mobile station can continue with the access and the process is transferred back to block 706 for transmission of the next burst. If on the other hand a free indication is found, the process is transferred to block 710.

In block 710 a failure is detected. The number of occurrences of this type of failures is subjected to a limit. If the maximum number N is exceeded, the process is aborted and returned to block 701.

The blocks 706B and 707 are performed in the base station by the microprocessor 130' which is activated by a signal from the control channel message detector 133' to read the reservation field RES. Microprocessor 130' thereafter activates the control channel message generator 132' to send a control message to the mobile station MS1 in the reserved time slot. Microprocessor 130' also sets time slot #1 either to a reserved time slot (block 707) or to a free time slot (block 706B).

The other function blocks in FIG. 10 are performed in the mobile station MS1 by the microprocessor 130 (FIG. 2). Microprocessor 130 is activated by the control channel message detector 133 in order to read the control message and the reservation fields RES1, RES2 and in order to activate the control channel message generator 132 to send the control message to the base station.

As described above, the access method of the present invention allows access burst collisions in very large cells to be avoided while reusing to the greatest extent possible previously defined burst formats. Channel coding and message length as well as in-burst placement of bits may be the same as currently used on a fast associated control channel (FACCH). Besides providing for two different types of accesses, the method of the present invention may be generalized as described to provide for multi-burst accesses of a number of bursts limited only by system time-out limits.

It will be appreciated by those of ordinary skill in the art that the present invention can be embodied in other specific forms without departing from the spirit of or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. In a cellular mobile radio telephone system, a method of access of a mobile station to a base station on a digital multiple-access control channel, said method comprising the steps of:

sending a first access burst from the mobile station to the base station;

sending information from the base station to the mobile station indicating to the mobile station a timing adjustment, a length of the timing adjustment being related to propagation delay according to which the mobile station is to send a subsequent second access burst, the second access burst being longer than the first access burst; and sending said second access burst from said mobile station to said base station.

2. The method of claim 1 wherein said first access burst is of the same duration and bit rate as a shortened burst transmitted on an uplink traffic channel.

3. The method of claim 2 wherein said first access burst is identical to said shortened burst except that each occurrence of a coded digital verification color code in said shortened burst is replaced with an arithmetic combination of mobile identification number information and a digital verification color code.

4. The method of claim 1 wherein said second access burst is of the same duration and bit rate as a full-duration burst transmitted on an uplink traffic channel.

5. The method of claim 4 wherein said second access burst is identical to said full-duration burst except that at least one of a slow associated control channel portion and a coded digital verification color code portion of said full-duration burst is replaced by other information.

6. The method of claim 5 wherein both said slow associated control channel portion and said coded digital verification color code portion of said full-duration burst are replaced by synchronization bit sequences.

7. The method of claim 5 wherein said second access burst uses the same in-burst placement of bits and the same coding as said full-duration burst and uses single-burst interleaving.

8. The method of claim 1 wherein said information sent from the base station to the mobile station is sent in a burst of the same duration and bit rate as a full-duration burst transmitted on a downlink traffic channel.

9. The method of claim 8 wherein said burst from the base station to the mobile station is identical to said full-duration burst except that at least one of a slow associated control channel portion and a coded digital verification color code portion of said full-duration burst is replaced by information other than said at least one of a slow associated control channel portion and a coded digital verification color code portion.

10. The method of claim 9 wherein both said slow associated control channel portion and said coded digital verification color code portion of said full-duration burst are replaced by synchronization bit sequences.

11. In a cellular mobile radiotelephone system, a method of access of a mobile station to a base station on a digital multiple-access control channel, comprising the steps of:

sending from said base station to said mobile station information indicating that the base station is to be accessed according to one of a plurality of access methods, the plurality of access methods involving different numbers of bursts from the mobile station to the base station;

sending an access burst from said mobile station to said base station;

sending information from said base station to said mobile station indicating whether or not a subsequent access burst is expected; and if a subsequent access burst is expected, sending said subsequent access burst from said mobile station to said base station.

12. The method of claim 11 wherein one of said plurality of access methods involves a single burst from the mobile station to the base station and another of said access methods involves two bursts from the mobile station to the base station.

13. The method of claim 12 wherein according to said another of said access methods the mobile station sends a first access burst to the base station so as to avoid interference with other accesses when said mobile station is a sufficient distance away from said base station that a basic guard time defined in a slot format used by said mobile station is insufficient to avoid interference with other accesses.

14. The method of claim 13 wherein said first access burst is of the same duration and bit rate as a shortened burst transmitted on a uplink traffic channel.

15. The method of claim 14 wherein said first access burst is identical to said shortened burst except that each occurrence of a coded digital verification color code in said shortened burst is replaced with mobile identification information.

16. The method of claim 15 wherein each occurrence of a coded digital verification color code in said shortened burst is replaced with an arithmetic combination of mobile identification information and a digital verification color code.

17. The method of claim 15 wherein said mobile identification information uniquely identifies a mobile station.

18. The method of claim 15 wherein said mobile identification information does not uniquely identify a mobile station.

19. The method of claim 13 wherein further according to said another of said access methods the base station in response to said first access burst sends to the mobile station a burst containing time-alignment information.

20. The method of claim 19 wherein further according to said another of said access methods the mobile station responsive to said time-alignment information sends a second access burst to the base station at a timing to avoid interference with other accesses.

21. The method of claim 20 wherein said second access burst is of the same duration and bit rate as a full-duration burst transmitted on an uplink traffic channel.

22. The method of claim 21 wherein said second access burst is identical to said full-duration burst except that at least one of a slow associated control channel portion and a coded digital verification color code portion of said full-duration burst is replaced by different information.

23. The method of claim 22 wherein both of said slow associated control channel portion and said coded digital verification color code portion of said full-duration burst are replaced by synchronization bit sequences.

24. The method of claim 22 wherein said burst from the base station to the mobile station is of the same duration and bit rate as a full-duration burst transmitted on a downlink traffic channel.

25. The method of claim 24 wherein said burst from the base station to the mobile station is identical to said full-duration burst except that at least one of a slow associated control channel portion and a coded digital verification color code portion of said full duration burst is replaced by information different than said at least one of a slow associated control channel portion and a coded digital verification color code portion.

26. The method of claim 25 wherein both of said slow associated control channel portion and said coded digital verification color code portion of said full-duration burst are replaced with synchronization bit sequences.

27. In a cellular mobile radiotelephone system, an apparatus enabling access of a mobile station to a base station on a digital multiple-access channel, said apparatus comprising:
    means for sending a first access burst from the mobile station to the base station;
    means for sending information from the base station to the mobile station indicating to the mobile station a timing adjustment, a length of the timing adjustment being related to propagation delay according to which to send a subsequent second access burst, the second access burst being longer than the first access burst; and
    means for sending said second access burst from said mobile station to said base station.

28. In a cellular mobile radiotelephone system, an apparatus enabling access of a mobile station to a base station on a digital multiple-access channel, comprising:
    means for sending from said base station to said mobile station information indicating that the base station is to be accessed according to one of a plurality access methods, the plurality of access methods involving different numbers of bursts from the mobile station to the base station;
    means for sending an access burst from said mobile station to said base station;
    means for sending information from said base station to said mobile station indicating whether or not a subsequent access burst is expected; and
    means for, if a subsequent access burst is expected, sending said subsequent access burst from said mobile station to said base station.

29. In a cellular mobile radiotelephone system, a method of digital call access by a mobile station using a slotted-access channel, comprising the steps of:
    receiving an indication of the relative size of a cell wherein said mobile station is located; and
    transmitting an initial access burst of a duration calculated, based on said indication of cell size, to avoid burst collisions with transmissions of other mobile stations at a base station of said cell.

30. In a cellular mobile radiotelephone system, a method of access of a mobile station to a base station on a digital multiple-access control channel, comprising the steps of:
    sending from said base station to said mobile station information indicating that the base station is to be accessed according to one of a plurality of access methods, the plurality of access methods involving different types of bursts from the mobile station to the base station;
    sending an access burst of a specified type according to said particular one of said plurality of access methods from said mobile station to said base station;
    sending information from said base station to said mobile station indicating whether or not a subsequent access burst is expected; and
    if a subsequent access burst is expected, sending said subsequent access burst from said mobile station to said base station.

31. In a cellular mobile radiotelephone system, an apparatus enabling access of a mobile station to a base station on a digital multiple-access channel, comprising:
    means for sending from said base station to said mobile station information indicating that the base station is to be accessed according to one of a plurality access methods, the plurality of access methods involving different types of bursts from the mobile station to the base station;
    means for sending an access burst of a specified type according to said particular one of said plurality of access methods from said mobile station to said base station;
    means for sending information from said base station to said mobile station indicating whether or not a subsequent access burst is expected; and
    means for, if a subsequent access burst is expected, sending said subsequent access burst from said mobile station to said base station.

32. In a cellular mobile radiotelephone system, apparatuses for communication between a mobile station and a base station on a digital multiple-access channel, comprising:
    means for sending from said base station to said mobile station information indicating that the base station is to be communicated with according to a particular one of a plurality of communication formats, different ones of the plurality of communication formats involving different lengths of bursts from the mobile stations to the base station; and
    means for sending bursts from said mobile station to said base station according to said particular one of a plurality of communication formats, wherein said plurality of communication formats include at least two formats
    selected from the group comprising a format of only short bursts, a format of only long bursts, and a format of a combination of a short burst followed by one or more long bursts.

33. In a cellular mobile radiotelephone system, a method of communication between a mobile station and a base station on a digital multiple-access channel, comprising the steps of:
    sending from said base station to said mobile station information indicating that the base station is to be communicated with according to a particular one of plurality of communication formats, different ones of the plurality of communication formats involving different lengths of bursts from the mobile stations to the base station; and
    sending bursts from said mobile station to said base station according to said particular one of a plurality of communication formats,
    wherein said plurality of communication formats include at least two formats selected from the group comprising a format of only short bursts, a format of only long bursts, and a format of a combination of a short burst followed by one or more long bursts.

* * * * *